United States Patent
Duvaut et al.

(10) Patent No.: US 7,974,583 B2
(45) Date of Patent: Jul. 5, 2011

(54) REAL-TIME FORMATION OF OPTIMAL POWER SPECTRAL DENSITY MASKS

(75) Inventors: Patrick Duvaut, Tinton Falls, NJ (US); Feng Ouyang, Holmdel, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 1943 days.

(21) Appl. No.: 11/031,020

(22) Filed: Jan. 10, 2005

(65) Prior Publication Data
US 2005/0152442 A1   Jul. 14, 2005

Related U.S. Application Data

(60) Provisional application No. 60/534,976, filed on Jan. 9, 2004.

(51) Int. Cl.
*H04B 7/00* (2006.01)
(52) U.S. Cl. ........ 455/69; 455/522; 455/423; 455/67.11
(58) Field of Classification Search .................. 455/522, 455/69, 13.4, 63.1, 67.11, 67.13, 553.1, 73, 455/423; 375/222, 260, 219, 229, 220
See application file for complete search history.

(56) References Cited

U.S. PATENT DOCUMENTS

| | | | | |
|---|---|---|---|---|
| 5,852,630 | A | * | 12/1998 | Langberg et al. ............. 375/219 |
| 6,292,559 | B1 | * | 9/2001 | Gaikwad et al. ............. 379/417 |
| 2002/0044597 | A1 | * | 4/2002 | Shively et al. ................ 375/222 |

OTHER PUBLICATIONS

Ranjan V. Sonalkar, David Applegate: "Shannon Capacity of Frequency-Overlapped Duplex DSL Channels," *IEEE International Conference on Communications*, (ICC), 2002.
Wei Yu, John Cioffi: "On Constant-Power Waterfilling," *IEEE International Conference on Communications*, (ICC), 2001.
Annex L in ITU-T Recommendation G.992.3, "Amendment 2 (Amendment to Annex J and Draft new Annexes L and M) to Recommendation G.992.3," Apr. 2004.

* cited by examiner

*Primary Examiner* — John Lee
(74) *Attorney, Agent, or Firm* — Thomas, Kayden, Horstemeyer & Risley, LLP (57) ABSTRACT

A technique for real-time formation of optimal power spectral density masks is disclosed. In one particular exemplary embodiment, the technique may be realized as a method for real-time formation of optimal power spectral density masks. The method may comprise sensing line conditions in a communication medium, wherein the communication medium is capable of carrying signals in a plurality of tones. The method may also comprise determining, in real-time, one or more power spectral density masks that substantially optimize transmissions of the signals in the plurality of tones. The method may further comprise transmitting the signals in the plurality of tones based on the one or more power spectral masks.

34 Claims, 5 Drawing Sheets

REAL-TIME FORMATION OF OPTIMAL POWER SPECTRAL DENSITY MASKS

CROSS-REFERENCE TO RELATED APPLICATIONS

This patent application claims priority to U.S. Provisional Patent Application No. 60/534,976, entitled "Real-Time Formation of Optimal Power Spectral Density Masks," filed Jan. 9, 2004, which is hereby incorporated by reference herein in its entirety.

FIELD OF THE INVENTION

The present invention relates generally to the field of telecommunications and, more particularly, to a technique for real-time formation of optimal power spectral density masks.

BACKGROUND OF THE INVENTION

The invention addresses some of the fundamental issues relevant to the performance objectives for long reach digital subscriber line (LDSL) systems (sometimes referred to as last mile DSL). The objective requirements typically are to provide minimum payload bit rates of 192 kb/s downstream and 96 kb/s upstream on loops that span the equivalent working length of, for example, 18 kilofeet on a 26 AWG (American Wire Gauge) communication line. The crosstalk noise environments for such systems are varied, and may include near-end crosstalk (NEXT) and far-end crosstalk (FEXT) disturbance from ISDN, HDSL, SHDSL, T1, and self-disturbers at both the central office (CO) and customer premise equipment (CPE) ends. NEXT from HDSL and SHDSL tend to limit the performance in the upstream channel while NEXT from T1 systems tend to severely limit the downstream channel performance.

Conventional approaches to LDSL rely on different upstream and downstream power spectral density (PSD) masks that exhibit complementary features. At the modem start up, based on a particular telecommunication standard or protocol, an upstream-downstream pair of PSD masks is selected and implemented. For example, the International Telecommunication Union (ITU)'s RE-ADSL2 standard (also known as ADSL2 Annex L standard), contains specifications for reach-extended operation of ADSL2 systems operating over plain old telephone system (POTS) connections. ADSL2 Annex L contains one mandatory downstream PSD mask, one optional downstream PSD mask, and two mandatory upstream PSD masks. However, in RE-ADSL2 standard and other conventional implementations, the upstream and downstream PSD masks are preformed or pre-configured and thus may not optimally conform to constant power constraints and/or be spectrally compatible with the signal environment in which the LDSL system is operating. For example, since RE-ADSL2 is designed to increase the reach of ADSL while in compliance with the North American Copper Network spectral compatibility regulations, RE-ADSL2 may not meet the long reach demands in other countries where both spectral compatibility rules and field loop/impairments may significantly differ from those in North America. Even in North America, RE-ADSL2 does not always guarantee an optimal set of PSD masks due to varying signal environments in different long reach implementations.

In view of the foregoing, a need exits for a technique for real-time formation of optimal PSD masks which overcomes the above-described inadequacies and shortcomings.

SUMMARY OF THE INVENTION

A technique for real-time formation of optimal power spectral density masks is disclosed. In one particular exemplary embodiment, the technique may be realized as a method for real-time formation of optimal power spectral density masks. The method may comprise sensing conditions in a communication medium (e.g., POTS, PSTN, ISDN), wherein the communication medium is capable of carrying signals in a plurality of tones. The method may also comprise determining, in real-time, one or more power spectral density masks that substantially optimize or improve transmissions of the signals in the plurality of tones. The method may further comprise transmitting the signals in the plurality of tones based on the one or more power spectral masks.

In another particular exemplary embodiment, the technique may be realized by a computer readable medium having code for causing a processor to perform real-time formation of optimal power spectral density masks. The computer readable medium may comprise code adapted to sense conditions in a communication medium, wherein the communication medium is capable of carrying signals in a plurality of tones. The computer readable medium may also comprise code adapted to determine, in real-time, one or more power spectral density masks that substantially optimize or improve transmissions of the signals in the plurality of tones. The computer readable medium may further comprise code adapted to transmit the signals in the plurality of tones based on the one or more power spectral masks.

In yet another particular exemplary embodiment, the technique may be realized by an apparatus for real-time formation of optimal power spectral density masks. The apparatus may comprise at least one modem that is adapted to sense conditions in a communication medium, wherein the communication medium is capable of carrying signals in a plurality of tones; determine, in real-time, one or more power spectral density masks that substantially optimize transmissions of the signals in the plurality of tones; and transmit the signals in the plurality of tones based on the one or more power spectral masks.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF THE INVENTION

The following description is intended to convey a thorough understanding of the present invention by providing a number of specific embodiments and details involving determining and utilizing an optimal power spectral density (PSD) mask in an asynchronous digital subscriber line (ADSL) system. In the context of this disclosure, the term "optimal" should be given a generous definition to include superior performance, and is not limited technically to the absolutely best performing PSD masks. That is, PSD masks that are substantially optimal in performance are also contemplated by this invention, and the use of "optimal" or "optimize" hereinafter should include substantially optimized PSD masks. In the context of this disclosure, the term "power spectral density mask" (or "PSD mask") refers to a transmit power spectral density or a transmit PSD. The present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

According to embodiments of the invention, a technique for real-time formation of optimal PSD masks, also known as a "Mask On Demand" or MoD technique, may involve a "field driven" mechanism wherein a DSL modem optimizes, in an early stage of its startup or in real time, an "efficient" and regionally "spectrally compatible" PSD mask with a given total power. This MoD technique is applicable to an upstream or downstream channel or both, and may operate in either a frequency division multiplexed (FDM) mode or an Overlap mode. Embodiments of the present invention may boost performance in DSL transmissions at medium and long ranges.

Figure 1:
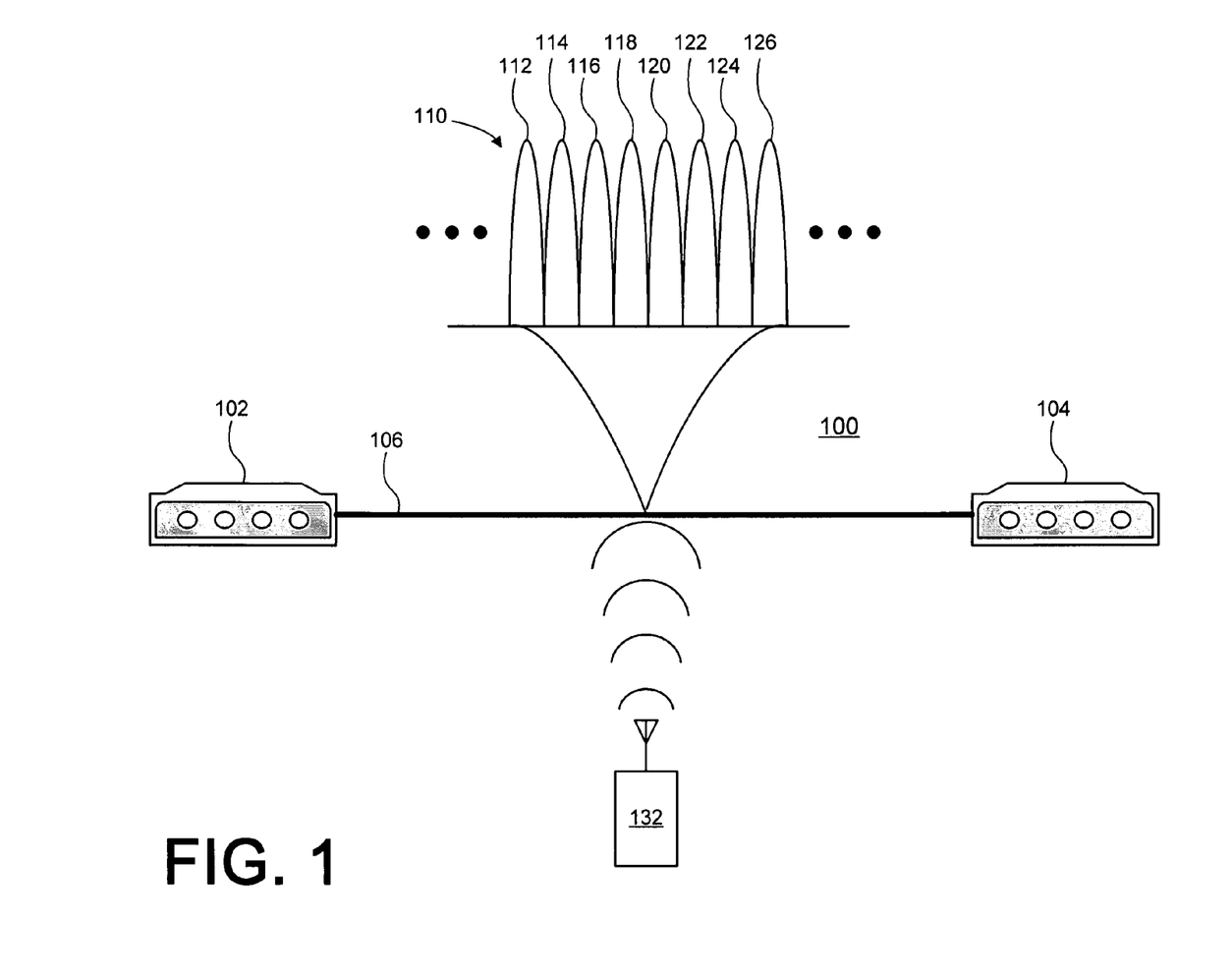
FIG. 1 depicts an exemplary LDSL system implementing dynamically-generated power spectral density masks in accordance with an embodiment of the present invention.

Referring now to FIG. 1, there is shown an exemplary LDSL system 100 implementing dynamically-generated upstream (US) and downstream (DS) power spectral density (PSD) masks in accordance with at least one embodiment of the present invention. The LDSL system 100 includes an ADSL modem 102 (e.g., an ADSL customer premise equipment or CPE) connected to a central office (CO) 104 (E.G., an ADSL access multiplexer or DSLAM) via a communication medium 106 (e.g., POTS, PSTN, or ISDN). Though not limited to a telephone line, the communication medium 106 is also referred to, hereinafter, as a telephone line 106. Frequency band 110 illustrates a portion of the plurality of discrete multitone (DMT) bins 112-126 used by the ADSL modems 102 and central office 104 to communicate data in accordance with one or more DMT-based techniques.

In the illustrated example, one or more radio frequency (RF) interferers 132 introduce noise at one or more DMT bins of the transmission bandwidth on the telephone line 106. The RF interferers 132 may include any of a variety of industrial, commercial or consumer devices, such as, for example, portable phones, cellular phones, transmission towers, microwaves, etc. Also present, but not illustrated, may be significant cross talk, such as near end cross talk (NEXT), far end cross talk (FEXT), and the like. It will also be appreciated that due to the length of the telephone line 106, the transmission channel may experience considerable line attenuation, particularly at the higher-frequency bins.

As a result of the noise introduced by the RF interferers 132, the length of the telephone line 106 (resulting in line attenuation) and the crosstalk present on the telephone line 106, numerous cyclic redundancy check (CRC) errors are likely to occur in one or more DMT bins, thereby forcing the ADSL modem 102 to reduce the bit transmission rate of the affected bins or cease using the bins altogether. Alternatively, certain conventional systems might implement a process whereby a pair of US and DS PSD masks are selected from a set of preformed (or predetermined) PSD masks to shape the signal transmission over telephone line 106. It will be appreciated, however, that while a preformed PSD mask may somewhat diminish the effects of line attenuation and crosstalk, such preformed PSD masks are formed for use in any of a variety of signal environments and thus are not optimized for the particular signal environment in which the LDSL system 100 is operating.

Accordingly, in at least one embodiment, the LDSL system 100 may utilize a cognitive approach whereby the signal environment of the LDSL system 100 is analyzed to identify the particular line attenuation characteristics and crosstalk characteristics of the signal environment of the LDSL system 100. Based on the particular signal environment characteristics, an optimal upstream and/or downstream PSD mask may be dynamically configured "on-the-fly." In at least one embodiment, the upstream/downstream PSD masks are optimally configured to comply with a fixed total transmission power constraint. The upstream/downstream masks also may be optimized to be spectrally compatible, i.e., in compliance with PSD constraints for each tone or frequency channel. The PSD constraints may be those imposed by local regulations or by telecommunication standards to minimize crosstalk among coexisting DSL systems, for example.

Figure 2:
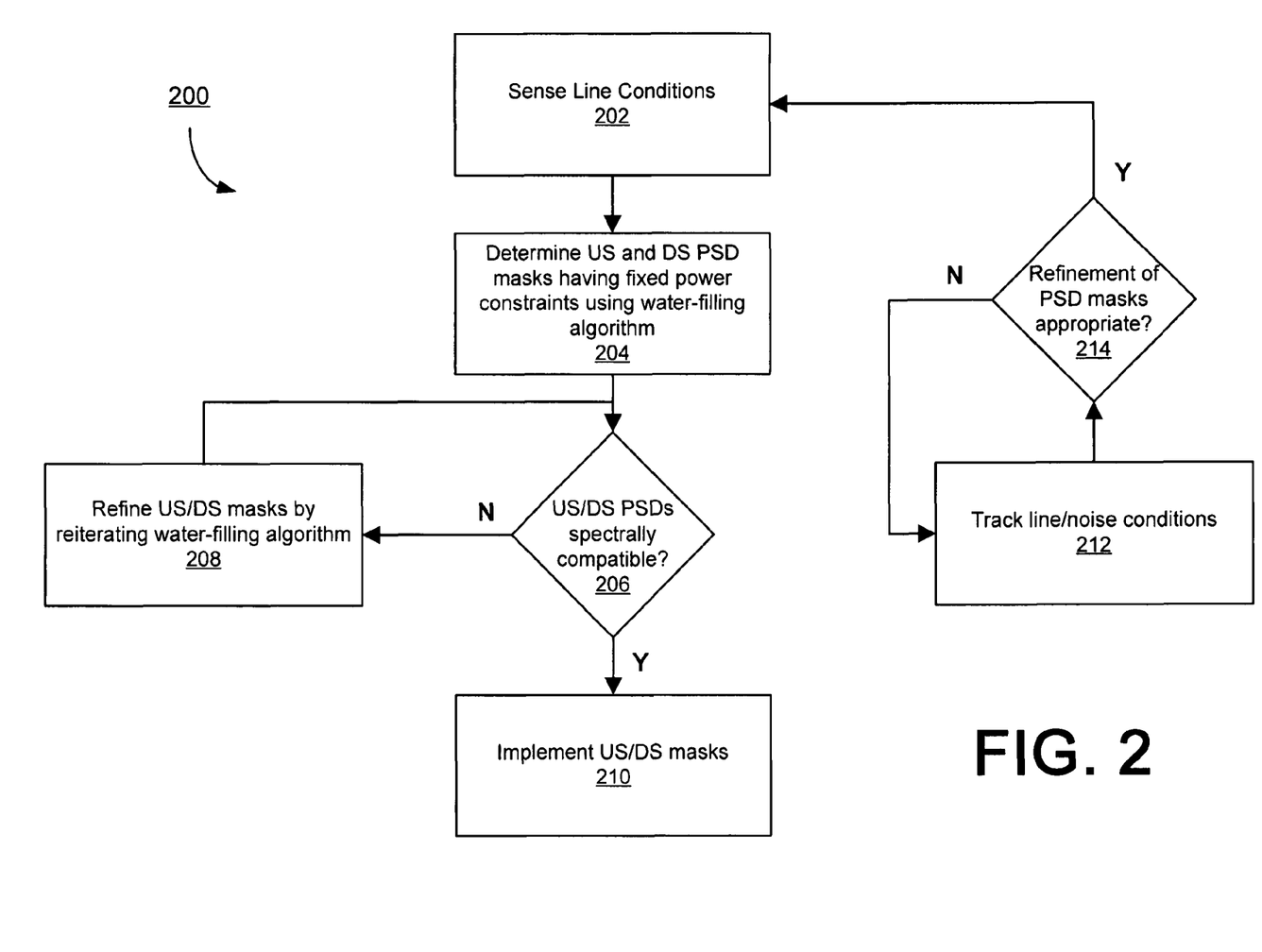
FIG. 2 is a flow chart illustrating an exemplary method for implementing dynamically-generated power spectral density masks in accordance with an embodiment of the present invention.

Referring now to FIG. 2, a cognitive process 200 for generating or configuring PSD masks optimized to a particular signal environment is illustrated in accordance with at least one embodiment of the present invention. The process 200 may be performed by the ADSL modem 102, the central office 104, a third device, or a combination thereof. The process 200 may initiate, for example, at start up while the ADSL modem 102 or central office 104 performs its initial training.

The process 200 initiates at step 202, wherein the signal environment of the LDSL system 100 (FIG. 1) is analyzed to determine the line attenuation characteristics and/or crosstalk characteristics of the telephone line 106, the ADSL modem 102 and the central office 104. These characteristics may be represented by, for example, a measurement of line attenuation versus frequency and/or crosstalk versus frequency for some or all of the transmission bandwidth. Techniques for sensing these characteristics are well-known in the art. For example, the ADSL modem 102 or the central office 104 may transmit probing signals towards each other to sense the line conditions of the communication medium 106.

At step 204, upstream and/or downstream PSD masks that optimizes the performance of the transmitted/received signal is configured based on the line attenuation/crosstalk characteristics, as well as other applicable constraints, such as a fixed total signal power or the requirement that the signal resulting from the application of the PSD mask be spectrally compatible.

In at least one embodiment, the upstream/downstream PSD masks are generated/configured to the particular characteristics and fixed power constraint based in part on any of a variety of water-filling algorithms. It will be appreciated that water-filling algorithms typically maximize the Shannon Capacity, where the Shannon Capacity represents the total data transmission capacity of a transmission channel.

The resulting optimized upstream and/or downstream PSD masks may be checked for spectral compatibility at step 206. Should the PSD masks be determined to be spectrally incompatible, the PSD masks may be further refined pursuant to the spectral compatibility constraint by reapplying the same or different water-filling algorithm at step 208. Thus, the process 200 may employ an iterative approach to repeatedly adjust the PSD masks to ensure spectral compatibility.

Upon determining that the environment-specific PSD masks are spectrally compliant, one or both of the upstream and downstream PSD masks may be implemented by the ADSL device (i.e., the ADSL modem 102 or the central office 104) in shaping the transmission channel to overcome the effects of the crosstalk and line attenuation present in the LDSL system 100.

In certain instances, the line attenuation or crosstalk characteristics of the LDSL system 100 may periodically change for any of a variety of reasons. Accordingly, in at least one embodiment, the process 200 includes a tracking step 212 that operates substantially in parallel with steps 202-210, whereby the telephone line 106 is monitored to detect a change in line conditions (e.g., by monitoring the number of CRC errors). If the change warrants the refinement or re-optimization of the upstream and/or downstream PSD masks, steps 202-210 may be repeated to configure new PSD masks optimized to the changed line conditions.

According to one embodiment of the invention, the optimal PSD masks may be dynamically determined based on a spectrally compliant superset of water-filling algorithm which simultaneously imposes a linear total power constraint and a nonlinear spectral compatibility constraint. This algorithm may be referred to as a mask-on-demand (MoD) algorithm. According to this algorithm, an optimal PSD mask $\gamma[q]$ (q represents individual tones) may be determined by calculating $$\text{MAX}_\gamma \left\{ \sum_{q \in T} \log_2(1 + \gamma[q]unr[q]) \right\} \text{ with } 0 \le \gamma[q], \sum_{q \in T} \gamma[q] = P;$$

$$\text{and } 0 \le F[q] \le \gamma[q] \le L[q]$$

wherein $$unr[q] = \frac{|h[q]|^2}{\theta[q]}$$

denotes a unit signal to noise ratio (SNR) which may be evaluated by a CO or CPE modem via probing signals;
 h[q] denotes a channel gain at tone q;
 θ[q] denotes PSD total disturbance at tone q, including, for example, white noises, crosstalk, echoes, etc;
 T is a set of targeted tones (e.g., a downstream FDM ADSL system may assume T={33, 34, 35, . . . , 255}), in which some tones may be originally targeted but switched off by the MoD algorithm if their SNRs are too small to bear the smallest constellation (the switched-off tones will have their energy re-allocated to loadable tones);

$$C \equiv \sum_{q \in T} \log_2(1 + \gamma[q]unr[q])$$

denotes a field Shannon Capacity;
 P denotes a fixed total power;
 L[q] is a PSD upper limit to ensure spectral compatibility; and
 F[q] is a PSD floor limit for minimum bit loading.

Figure 3:
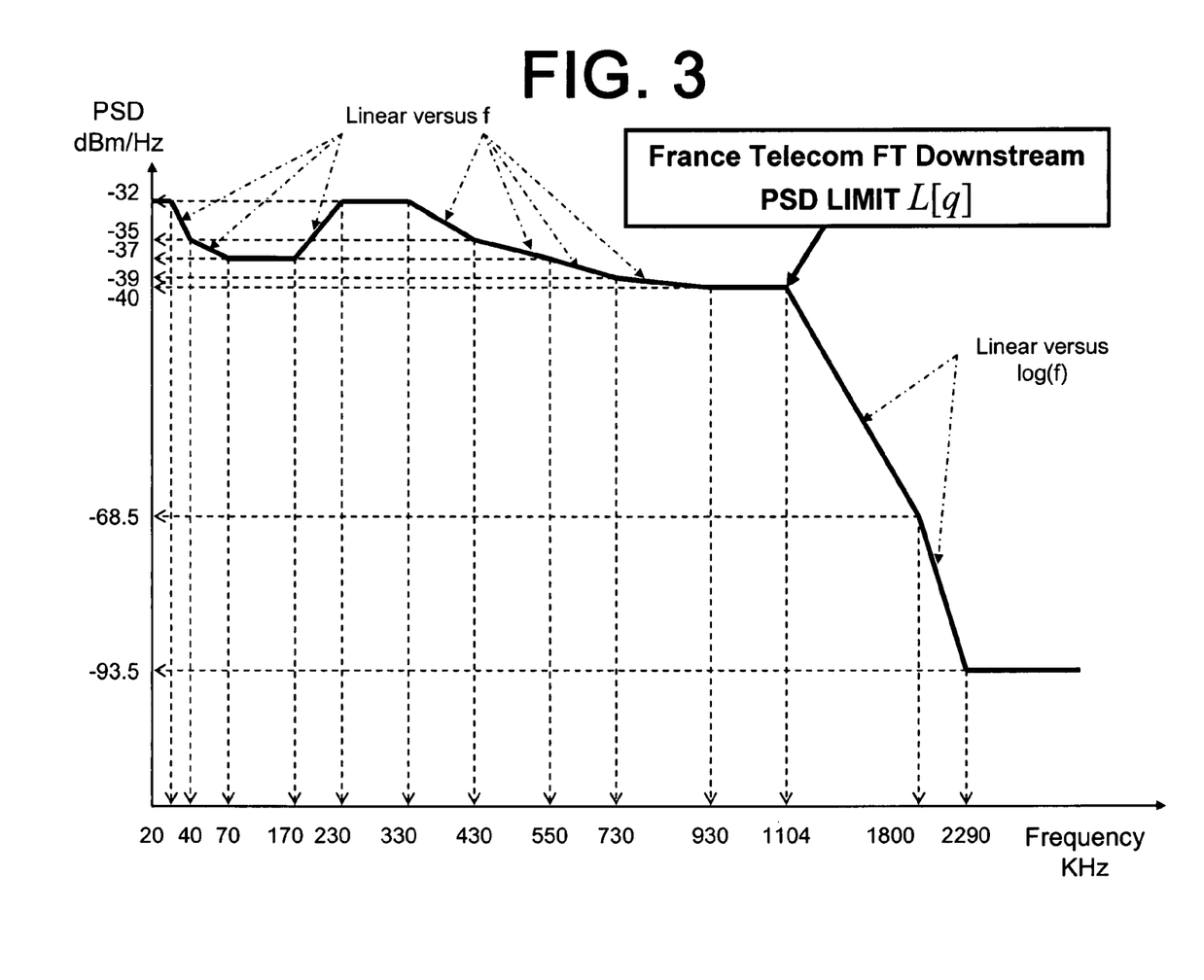
FIG. 3 illustrates an exemplary downstream nominal PSD limit that ensures PSD spectral compliance with France Telecom recommendations in accordance with an embodiment of the present invention.
Figure 4:
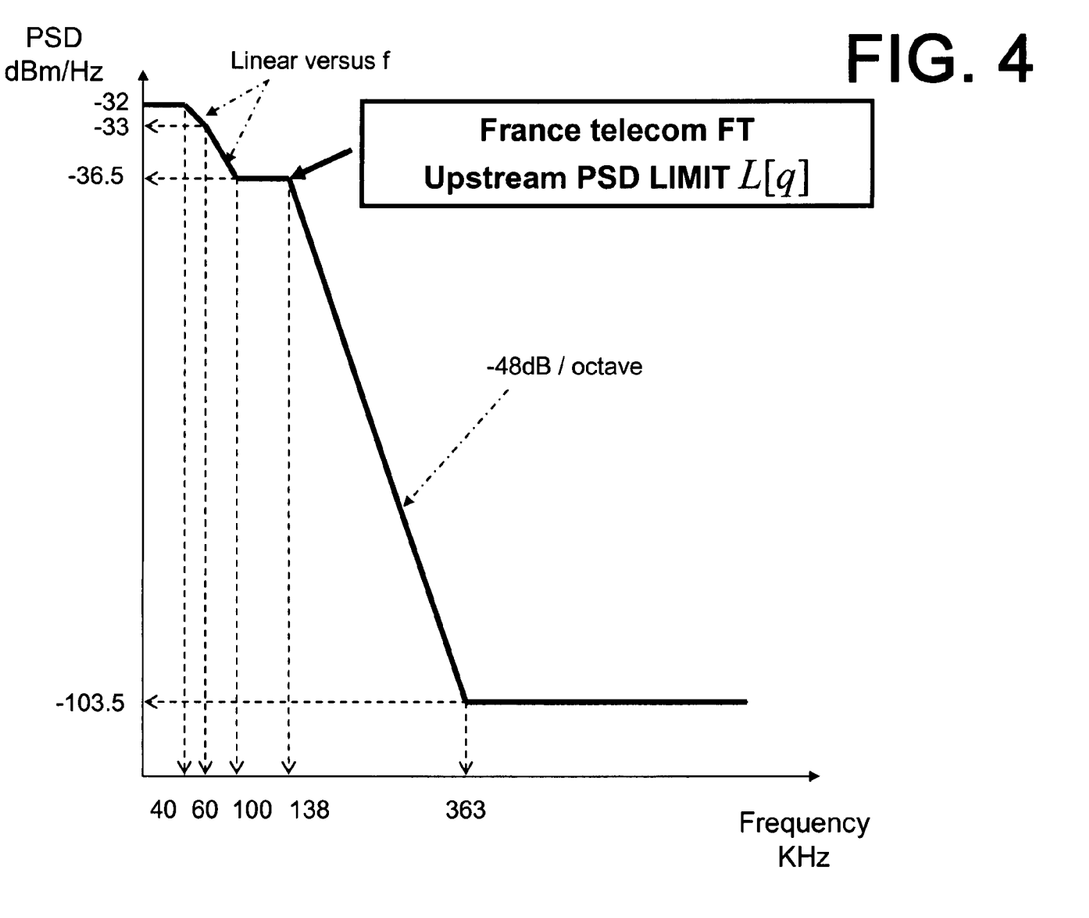
FIG. 4 illustrates an exemplary upstream nominal PSD limit that ensures PSD spectral compliance with France Telecom recommendations in accordance with an embodiment of the present invention.

According to an embodiment of the invention, the PSD limit L[q] may be pre-defined in such a way that any PSD mask $\gamma[q]$ optimized by the MoD algorithm passes all the regional Method B spectral compatibility tests. Method B spectral compatibility tests define worst performances of a few "protected systems" in certain worst-case scenarios. To be qualified under a Method B test, a new system should not worsen the protected system's "worst performances" when the new system is added to the crosstalk of the worst-case scenario. Method B was used to qualify READSL in North America, according to T1-417 spectrum management recommendations. The PSD limit L[q] is typically designed off-line by the DSL system operator or local regulatory authorities based on both the MoD procedure and local Method B spectral compatibility rules. The PSD limit L[q] typically exhibits a much higher total power than the effective PSD transmit power P. FIG. 3 illustrates an exemplary downstream nominal PSD limit that ensures PSD spectral compliance with France Telecom recommendations. The downstream PSD limit total power is 23.7 dBm. FIG. 4 illustrates an exemplary upstream nominal PSD limit that ensures PSD spectral compatibility according to France Telecom recommendations. The upstream PSD limit total power is 16.7 dBm.

Figure 5:
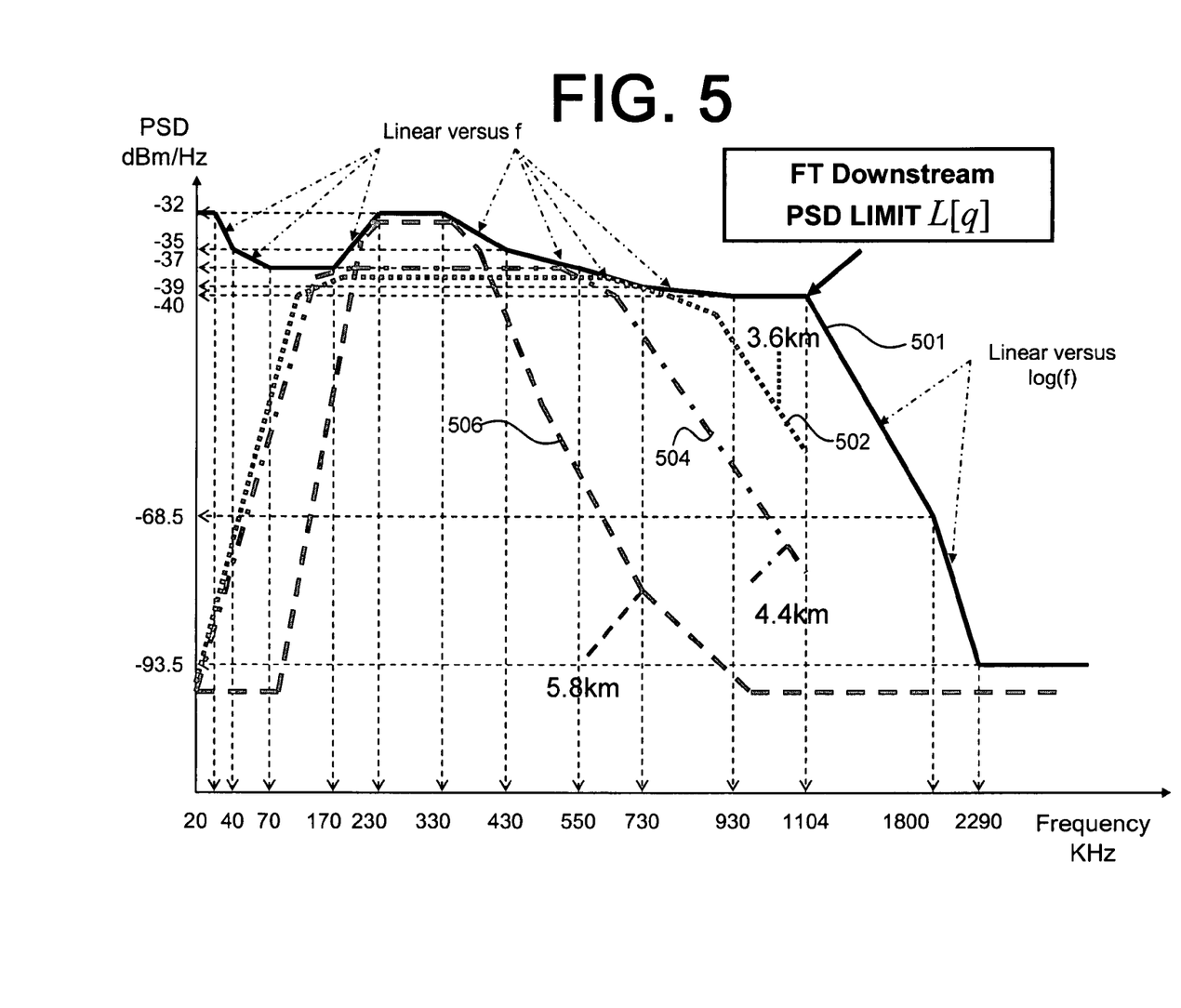
FIG. 5 shows an exemplary downstream PSD mask that has been optimized in accordance with an embodiment of the present invention.

By solving for a maximum Shannon Capacity C, an optimal PSD mask $\gamma[q]$ may be determined, wherein the PSD mask $\gamma[q]$ complies with a spectral compatibility constraint and an optional minimum bit loading constraint. FIG. 5 shows an exemplary PSD mask that has been optimized in compliance with the France Telecom recommended downstream PSD limit as shown in FIG. 3. The solid line 501 illustrates the France Telecom recommended downstream PSD limit L[q]. The dotted line 502 illustrates an optimized DS PSD mask for a reach of 3.6 km with a total power constraint of 19.8 dBm. The dot-dashed line 504 illustrates an optimized DS PSD mask for a reach of 4.4 km with a total power constraint of 19.8 dBm. The dashed line 506 illustrates an optimized DS PSD mask for a reach of 5.6 km with a total power constraint of 19.8 dBm. As shown in FIG. 5, all three PSD masks are capped by the PSD limit L[q].

At this point it should be noted that the technique for real-time formation of optimal power spectral density masks in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with dynamic formation of power spectral density masks in accordance with the present invention as described above. Alternatively, one or more processors operating in accordance with stored instructions may implement the functions associated with dynamic formation of power spectral density masks in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as described herein.

The invention claimed is:

1. A method for real-time formation of optimal power spectral density masks, the method comprising:
    sensing conditions in a communication medium, wherein the communication medium is capable of carrying signals in a plurality of tones;
    determining, in real-time, one or more power spectral density masks that substantially optimize transmissions of the signals in the plurality of tones;
    transmitting the signals in the plurality of tones based on the one or more power spectral masks;
    monitoring the communication medium to detect a change in the conditions; and
    determining one or more new power spectral density masks in response to the detected change.

2. The method according to claim 1, wherein the step of sensing the conditions further comprises transmitting one or more probing signals through the communication medium.

3. The method according to claim 1, wherein the one or more power spectral density masks are determined based on a spectrally compliant superset of water-filling algorithm.

4. The method according to claim 3 further comprising re-applying the spectrally compliant superset of water-filling algorithm to iteratively refine the one or more power spectral density masks.

5. The method according to claim 3, wherein the one or more power spectral density masks are determined subject to a fixed total signal power constraint.

6. The method according to claim 3, wherein the one or more power spectral density masks are determined subject to a spectral compatibility constraint.

7. The method according to claim 6, wherein the spectral compatibility constraint is predefined based on regional telecommunication regulations.

8. The method according to claim 3, wherein the one or more power spectral density masks are determined subject to a minimum bit loading constraint.

9. The method according to claim 1, wherein the one or more power spectral density masks comprise one or more upstream masks and one or more downstream masks.

10. The method according to claim 1, wherein the conditions in the communication medium comprise at least one of attenuation characteristics and crosstalk characteristics associated with the communication medium.

11. The method according to claim 1, wherein the communication medium is a digital subscriber line (DSL).

12. The system according to claim 1, wherein the means for sensing the conditions further comprises means for transmitting one or more probing signals through the communication medium.

13. The system according to claim 1, wherein the one or more power spectral density masks are determined based on a spectrally compliant superset of water-filling algorithm.

14. The system according to claim 13, further comprising means for re-applying the spectrally compliant superset of water-filling algorithm to iteratively refine the one or more power spectral density masks.

15. A non-transitory computer readable medium having code for causing a processor to perform real-time formation of optimal power spectral density masks, the non-transitory computer readable medium comprising:
    code adapted to sense conditions in a communication medium, wherein the communication medium is capable of carrying signals in a plurality of tones;
    code adapted to determine, in real-time, one or more power spectral density masks that substantially optimize transmissions of the signals in the plurality of tones;
    code adapted to transmit the signals in the plurality of tones based on the one or more power spectral masks;
    code adapted to monitor the communication medium to detect a change in the conditions; and
    code adapted to determine one or more new power spectral density masks in response to the detected change.

16. The computer readable medium according to claim 15, wherein the code adapted to sense the conditions further comprises code adapted to transmit one or more probing signals through the communication medium.

17. The computer readable medium according to claim 15, wherein the one or more power spectral density masks are determined based on a spectrally compliant superset of water-filling algorithm.

18. The computer readable medium according to claim 17 further comprising code adapted to re-apply the spectrally compliant superset of water-filling algorithm to iteratively refine the one or more power spectral density masks.

19. The computer readable medium according to claim 17, wherein the one or more power spectral density masks are determined subject to a fixed total signal power constraint.

20. The computer readable medium according to claim 17, wherein the one or more power spectral density masks are determined subject to a spectral compatibility constraint.

21. The computer readable medium according to claim 20, wherein the spectral compatibility constraint is predefined based on regional, telecommunication regulations.

22. The computer readable medium according to claim 17, wherein the one or more power spectral density masks are determined subject to a minimum bit loading constraint.

23. The computer readable medium according to claim 15, wherein the one or more power spectral density masks comprise one or more upstream masks and one or more downstream masks.

24. The computer readable medium according to claim 15, wherein the conditions in the communication medium comprise at least one of attenuation characteristics and crosstalk characteristics associated with the communication medium.

25. The computer readable medium according to claim 15, wherein the communication medium is a digital subscriber line (DSL).

26. An apparatus for real-time formation of optimal power spectral density masks, the apparatus comprising at least one modem that is adapted to:

sense conditions in a communication medium, wherein the communication medium is capable of carrying signals in a plurality of tones;

determine, in real-time, one or more power spectral density masks that substantially optimize transmissions of the signals in the plurality of tones;

transmit the signals in the plurality of tones based on the one or more power spectral masks;

monitor the communication medium to detect a change in the conditions; and determine one or more new power spectral density masks in response to the detected change.

27. The apparatus according to claim 26, wherein the at least one modem is further adapted to transmit one or more probing signals through the communication medium.

28. The apparatus according to claim 26, wherein the one or more power spectral density masks are determined based on a spectrally compliant superset of water-filling algorithm.

29. The apparatus according to claim 28, wherein the at least one modem is further adapted to re-apply the spectrally compliant superset of water-filling algorithm to iteratively refine the one or more power spectral density masks.

30. The apparatus according to claim 28, wherein the one or more power spectral density masks are determined subject to a fixed total signal power constraint.

31. The apparatus according to claim 28, wherein the one or more power spectral density masks are determined subject to a spectral compatibility constraint.

32. The apparatus according to claim 31, wherein the spectral compatibility constraint is predefined based on regional telecommunication regulations.

33. The apparatus according to claim 31, wherein the one or more power spectral density masks are determined subject to a minimum bit loading constraint.

34. A system, comprising:

means for sensing conditions in a communication medium, wherein the communication medium is capable of carrying signals in a plurality of tones;

means for determining, in real-time, one or more power spectral density masks that substantially optimize transmissions of the signals in the plurality of tones;

means for transmitting the signals in the plurality of tones based on the one or more power spectral masks;

means for monitoring the communication medium to detect a change in the conditions; and means for determining one or more new power spectral density masks in response to the detected change.

* * * * *